Aug. 12, 1947.                E. D. DE WITT                  2,425,516
                    CASTER WHEEL ASSEMBLY FOR TRACTORS
                    Filed Nov. 28, 1945        4 Sheets-Sheet 4
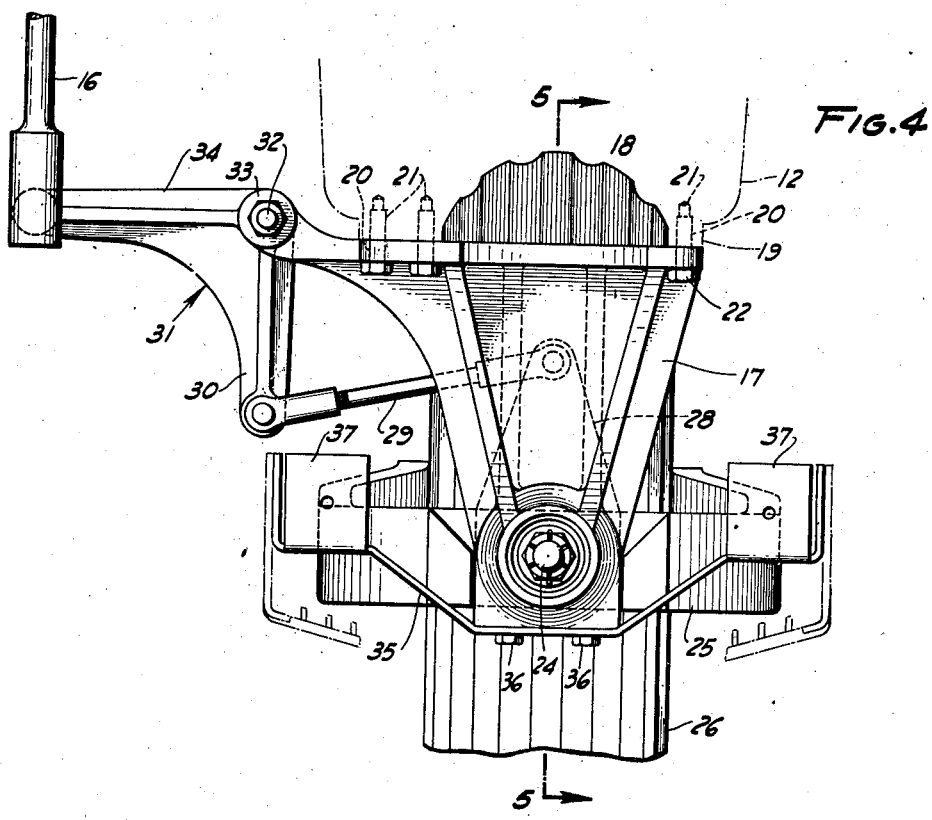
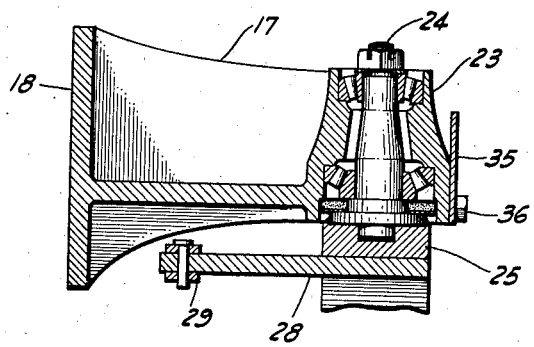
FIG. 5
INVENTOR.
ELVIN D. DEWITT
BY Patented Aug. 12, 1947

2,425,516

UNITED STATES PATENT OFFICE 2,425,516

CASTER WHEEL ASSEMBLY FOR TRACTORS

Elvin D. De Witt, San Juan Bautista, Calif.

Application November 28, 1945, Serial No. 631,282

5 Claims. (Cl. 280—92)

1

This invention relates to tractors of the type used in agriculture for cultivating, mowing and like operations, and particularly pertains to a caster wheel mounting for wheeled tractors.

One of the standard and widely used tractors employed in agriculture is the "Ford cultivator tractor." This tractor is of the four-wheel type with the two front wheels mounted in a manner more or less conventional to machines of this type. For certain types of work, such as orchard, mowing and hillside work, the use of such type of front wheel mounting is of considerable advantage. However, in certain types of cultivation of row crops such front wheel mounting is disadvantageous in several respects, principally in that it is difficult to maintain both front wheels properly and centrally between the rows, and the large turning radius required for such wheel mounting requires considerable turning space to be uncultivated at the ends of the rows.

Heretofore, tractors of this general character have been produced with a single caster wheel in lieu of the conventional two front wheels which overcomes the disadvantages referred to. However, the use of such tractors is, to a great extent, limited; in fact, more limited in adaptability than the conventional two front wheel machines.

It is the principal object of my present invention to provide a simple and comparatively inexpensive caster wheel assembly so constructed that it may be interchanged on a "Ford cultivator tractor" with the standard front wheel and axle assembly without making any changes in the construction of the tractor whatsoever, except for the substitution of the caster wheel assembly for the standard front wheel and axle assembly.

One form which the invention may assume is exemplified in the following description and illustrated by way of example in the accompanying drawings, in which.

2

Figure 1:
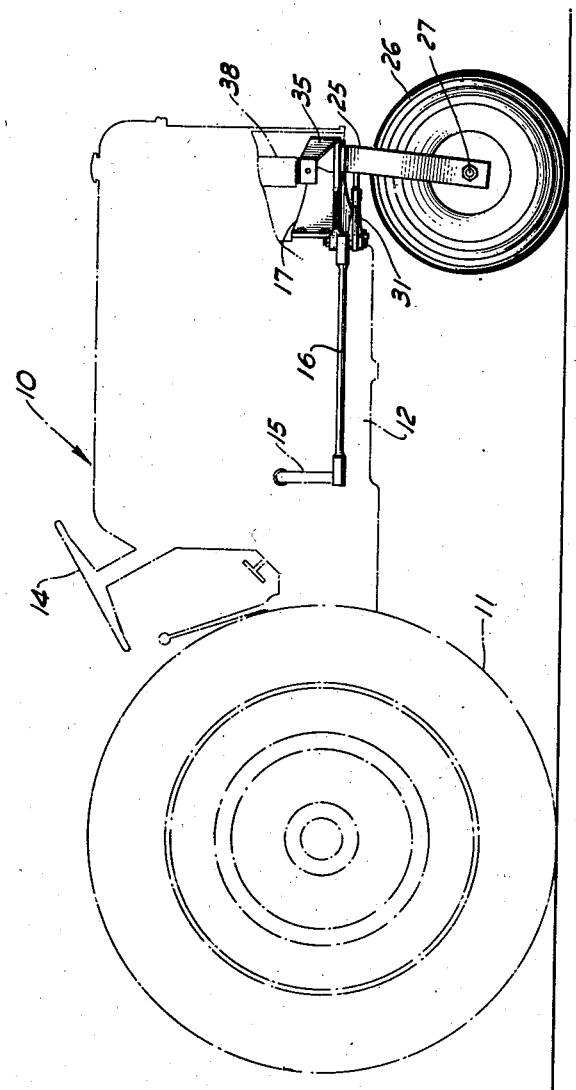
Fig. 1 is a view in side elevation showing my improved caster wheel assembly as it is mounted on a "Ford cultivator tractor" in lieu of the usual two front wheel axle assembly, the tractor being shown in broken lines.
Figure 2:
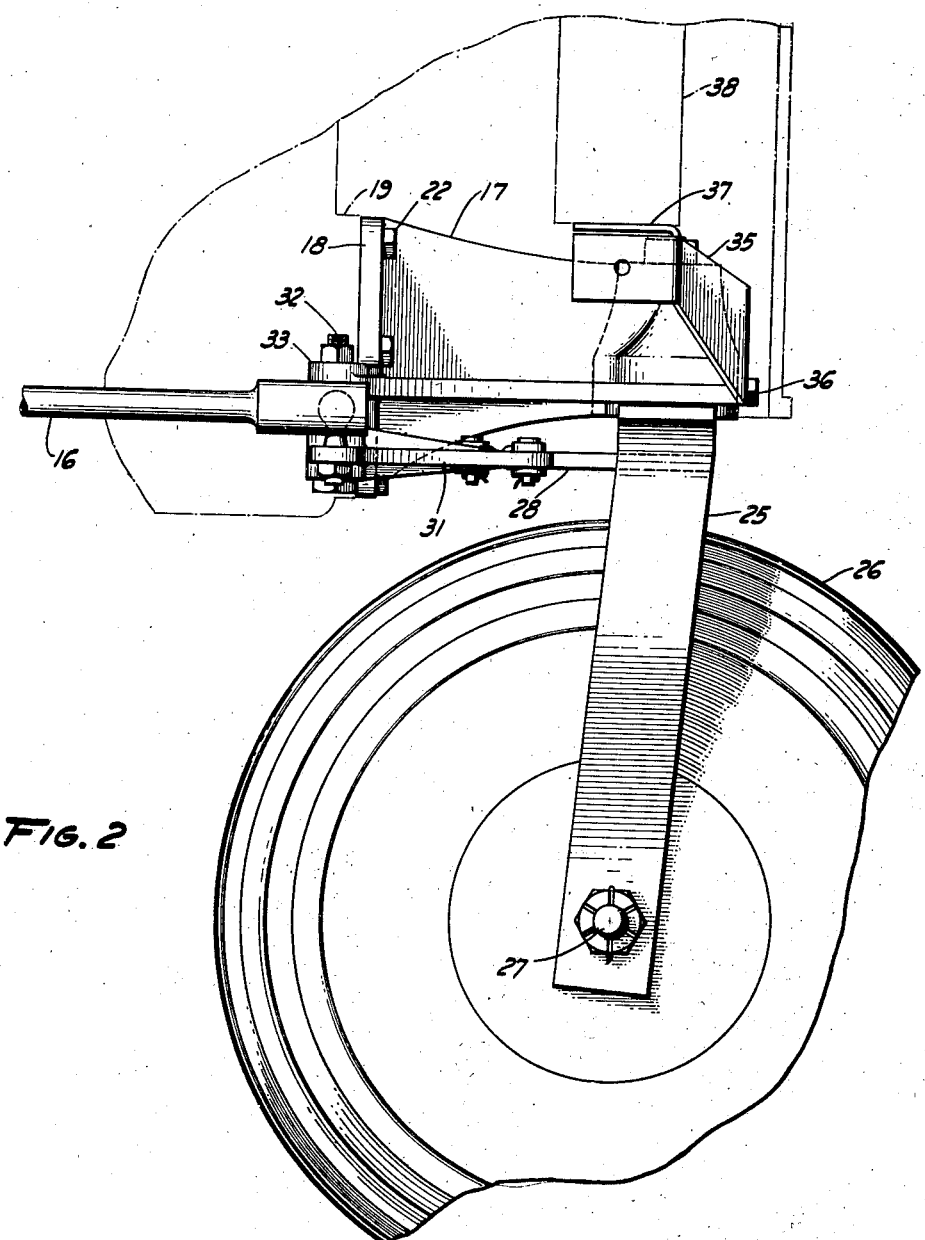
Fig. 2 is an enlarged view in side elevation of the caster wheel assembly showing the manner of its attachment to the tractor.
Figure 3:
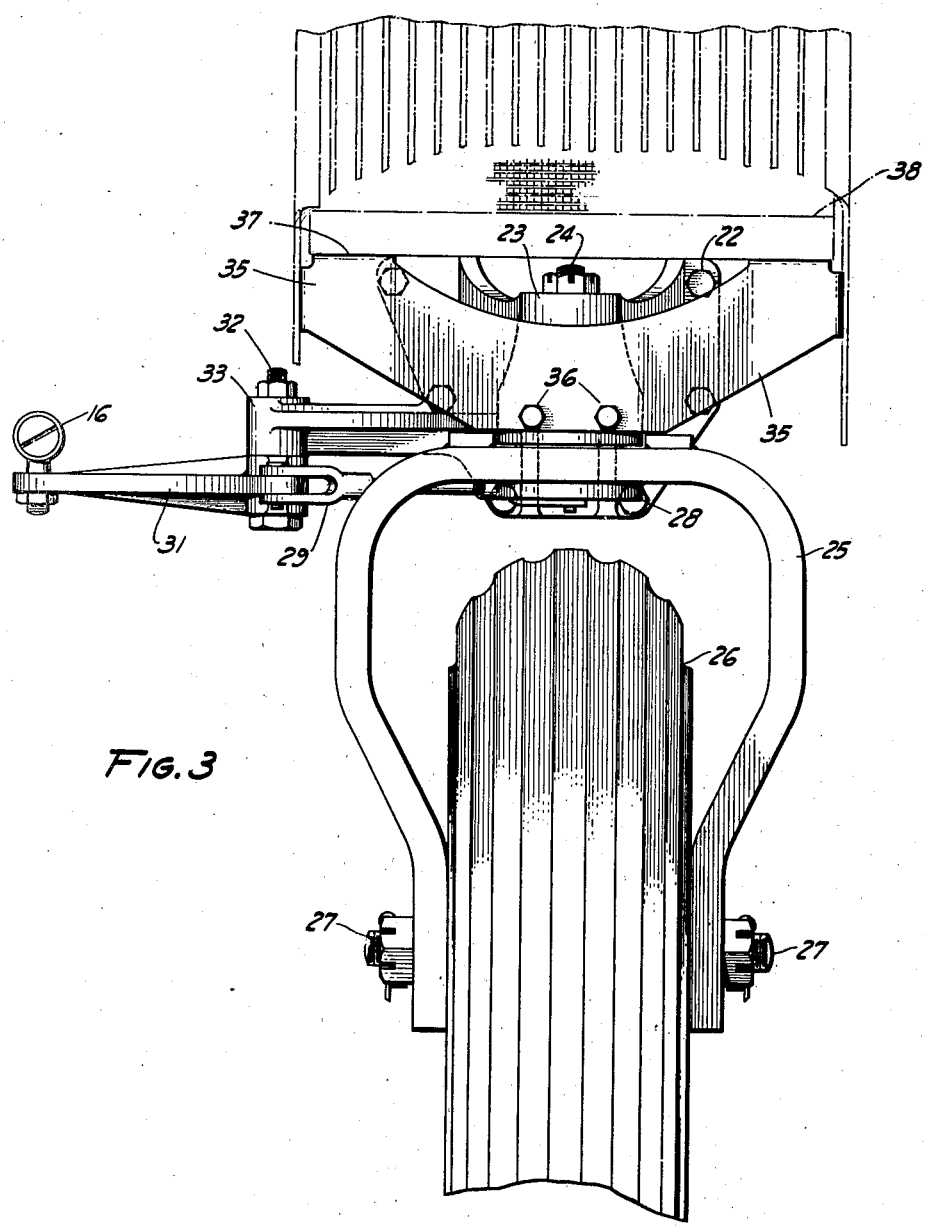
Fig. 3 is a view in front elevation of the caster wheel assembly shown in Fig. 2, disclosing its construction and the manner of its attachment to the tractor.

Fig. 4 is a plan view of my improved caster wheel assembly with parts of the tractor shown in broken lines.

Fig. 5 is a view in section taken on line 5—5 of Fig. 4 and turned at ninety degrees.

Referring more particularly to the accompanying drawings, 10 indicates a standard "Ford cultivator tractor" having the usual rear driving wheels 11, motor crank-case 12 (which forms part of the tractor frame), steering wheel 14, which, when rotated, actuates steering arms 15 at opposite sides of the tractor frame. These steering arms 15 swing in a vertical plane longitudinally of the tractor and their lower ends are connected by toggle connections to drag links 16 which in turn are connected with the spindles (not shown) of the wheels (not shown) of the standard front wheel and axle assembly (not shown) of the tractor.

It is my object to disconnect the standard front wheel and axle assembly of the tractor from the steering apparatus, which means disconnection from the front end of the drag links 16, and then remove such front wheel and axle assembly from the tractor as a whole and substitute in lieu thereof my improved caster wheel assembly. It is with this caster wheel assembly and the manner of its mounting on a "Ford cultivator tractor" which constitutes my invention.

My improved caster wheel assembly precisely fits the same frame connections by which the standard front wheel and axle assembly was mounted on the tractor, so that no mechanical modifications of the tractor need be made. Of course, this permits expeditious interchanging of my caster wheel assembly and the standard front wheel and axle assembly of the tractor.

The improved caster wheel assembly comprises a main adapter bracket 17 having a base plate 18 complemental to the standard pad 19 formed on the forward end of the motor crank-case 12. The bolt holes 20 in the base plate 18 precisely register with the tapped holes 21 in the pad 19, so that the adapter bracket may be firmly clamped to the crank-case 12 by cap screws 22.

It should be pointed out that the base plate 18 fits the same pad 19 and is bolted thereto by the use of the same cap screws 22 engaging the same tapped holes 21 as was employed to secure the standard front wheel axle assembly to the crank-case. The main adapter bracket 17 extends forwardly of the crank-case when its base plate 18 is bolted to the latter, and it is formed at its forward end with a spindle bearing 23. The main adapter bracket 17 rigidly supports this spindle bearing 23 on the longitudinal center line of the tractor at a proper distance forwardly of the crank-case 12.

Rotatably suspended beneath the spindle bearing 23 by means of a spindle 24 mounted in the bearing 23 is a rotatable caster yoke 25, the spindle being welded to the yoke. Rotatably mounted in this caster yoke 25 is a caster wheel 26 rotatably mounted on an axle 27 projecting between the legs of the yoke and secured therein. The yoke 25, of course, rotates about a vertical axis, which is the axis of the spindle 24, while the caster wheel 26 revolves about the axis of the axle 27, which is perpendicular to the axis of the spindle 24 and consequently is on a horizontal plane.

To enable turning of the yoke 25 about the axis of the spindle 24, I secure a crank arm 28 to the yoke centrally thereof just below the point of connection between the spindle 24 and the yoke 25. This crank arm 28 extends horizontally and rearwardly and its rearmost end is connected by a link 29 to one arm 30 of a bell crank lever 31. This bell crank lever 31 is mounted to oscillate in a horizontal plane about a vertical pintle 32 mounted in an outboard bearing 33 formed as an integral part of the adapter bracket 17. The bearing 33 is positioned at a point spaced laterally outward from one side of the base plate 18 of the adapter bracket 17, as most clearly illustrated in Fig. 4.

The other arm 34 of the bell crank lever 31 is adapted to be connected to the forward end of the drag link 16 at the right side of the tractor. The connection between the drag link 16 and the yoke 25 through the medium of the bell crank lever 31, the link 29 and the crank arm 28 is such that turning of the steering wheel 14 to the right effects turning of the caster yoke 25 in the same direction, so that normal steering is accomplished.

It should be pointed out that the standard equipment of the tractor includes two drag links 16 for the standard front wheel and axle assembly. However, in the substitution of my caster assembly for the standard front wheel assembly, I utilize but the one drag link 16. Thus, no use is made of the other steering arm 15 and other drag link 16 when employing my caster wheel assembly on the tractor.

At the forward end of the adapter bracket there is provided a lateral frame member 35 which is fixed by cap screws 36 to the front face of the spindle bearing 23. The ends of this lateral frame member 35 are fitted with pads 37 for connection with the underside of the radiator 38 forming a standard part of the tractor 10. The lateral frame member 35 is thus substituted for the front wheel and axle assembly as a support for the radiator 38, and it fits the same and may be connected thereto without any modification thereof.

From the foregoing it is obvious that a "Ford cultivator tractor" can be readily adapted for all types of row crop cultivation and fitted with a caster wheel assembly by simply disconnecting the forward ends of the drag links 16 from the standard front wheel and axle assembly, and then unbolted that assembly from the frame and radiator and removing it as a whole from the tractor. Thereafter, it is only necessary to position my caster wheel assembly and bolt the base plate 18 to the pad 19 and the pads 37 of the lateral frame member 35 to the radiator. The arm 34 of the bell crank lever 31 may then be connected to the forward end of one drag link 16, and the tractor is then equipped with a caster wheel at its forward end making it more suitable for row crop cultivation than the standard two wheel axle assembly of the tractor.

In that no mechanical modifications of the main tractor parts need be made, obviously the caster wheel assembly and the standard two wheel axle assembly of the tractor may be interchanged very readily by the user and thus make a tractor completely adaptable to all conditions of operation. In other words, the tractor user may so equip his tractor that it will be most efficiently operated under all conditions of use.

I desire to point out that by substituting a caster wheel assembly such as I have here provided for the two wheel front axle assembly, the tractor will be better adapted for use in row crop cultivation in that it is much easier to maintain the wheel centrally between rows. Likewise, the tractor may be turned on a shorter radius at the ends of the rows so that the turning space may be maintained at a minimum.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A caster wheel assembly for a tractor having a drag link and a steering wheel for actuating said link comprising an adapter bracket having a rearmost end to be bolted to the forward end of the tractor crank-case so as to extend forwardly therefrom, a caster yoke suspended from the forward end of the bracket to rotate about a vertical axis, a caster wheel carried by the yoke, a bell crank lever pivoted to the adapter bracket, one arm of said lever being adapted to be connected to the said drag link of the tractor, the other arm of said lever adapted to be connected to said yoke whereby reciprocation of the drag link will be accompanied by turning movement of the yoke.

2. A caster wheel assembly for a tractor having a drag link and a steering wheel for actuating said link comprising an adapter bracket adapted to be affixed at its rearmost end to the forward end of the tractor crank-case, said bracket extending horizontally and forwardly, a spindle bearing rigidly carried by the forwardmost end of said bracket, a caster yoke having a spindle engaging said bearing and by which it is suspended from the bracket to rotate about a vertical axis, a caster wheel carried by the yoke, a bell crank lever pivoted to the adapter bracket at a point at one side of the latter and contiguous to the rearmost end thereof, one arm of said lever being adapted to be connected to the said drag link of the tractor whereby endwise movement of the drag link will be accompanied by turning movement of the bell crank lever, a crank arm fixed to the yoke and extending rearwardly thereof, a link connection between said crank arm and the other arm of the bell crank lever whereby swinging movement of the bell crank lever will be accompanied by reverse swinging movement of the yoke.

3. A caster wheel assembly for a tractor having a drag link and a steering wheel for actuating said link comprising a rigid adapter bracket having a rearmost end to be bolted to the forward end of the tractor crank-case so as to extend horizontally and forwardly therefrom, a spindle bearing rigidly carried by the forwardmost end of said bracket at the longitudinal center of the tractor, a caster yoke, a spindle fixed to the caster yoke and journaled in said bearing for rotation about a vertical axis in the bearing, said spindle engaging said bearing whereby to suspend said yoke, a caster wheel carried by the yoke for rotation about an axis perpendicular to the axis of the spindle, a bell crank lever pivoted to the adapter bracket at a point spaced from one side of the same and adjacent the rearmost end of the bracket, one arm of said lever being adapted to be connected to the said drag link of the tractor at the side of the tractor, said bell crank lever being adapted to oscillate in a horizontal plane whereby endwise movement of the drag link will be accompanied by turning movement of the bell crank lever about its pivotal point, a crank arm fixed to the yoke centrally thereof and extending horizontally and rearwardly thereof beneath said bracket, a link connected at one end to the inner end of said crank arm and at its other end to the end of the other arm of the bell crank lever whereby swinging movement of the bell crank lever will be accompanied by reverse swinging movement of the yoke.

4. A caster wheel assembly for a tractor having a drag link and a steering wheel for actuating said link comprising an adapter bracket adapted to be affixed at its rearmost end to the forward end of the tractor crank-case, said bracket extending horizontally and forwardly, a spindle bearing rigidly carried by the forwardmost end of said bracket, a caster yoke having a spindle engaging said bearing and by which it is suspended from the bracket to rotate about a vertical axis, a caster wheel carried by the yoke, a bell crank lever pivoted to the adapter bracket at a point at one side of the latter and contiguous to the rearmost end thereof, one arm of said lever being adapted to be connected to the said drag link of the tractor whereby endwise movement of the drag link will be accompanied by turning movement of the bell crank lever, a crank arm fixed to the yoke and extending rearwardly thereof, a link connection between said crank arm and the other arm of the bell crank lever whereby swinging movement of the bell crank lever will be accompanied by reverse swinging movement of the yoke, a lateral frame member fixed at its center to said bearing and adapted to be connected at its outer ends to the underside of the radiator of the tractor adjacent the sides thereof.

5. A caster wheel assembly for a tractor having a drag link and a steering wheel for actuating said link comprising a rigid adapter bracket having a rearmost end to be bolted to the forward end of the tractor crank-case so as to extend horizontally and forwardly therefrom, a spindle bearing rigidly carried by the forwardmost end of said bracket at the longitudinal center of the tractor, a caster yoke, a spindle fixed to the caster yoke and journaled in said bearing for rotation about a vertical axis in the bearing, said spindle engaging said bearing whereby to suspend said yoke, a caster wheel carried by the yoke for rotation about an axis perpendicular to the axis of the spindle, a bell crank lever pivoted to the adapter bracket at a point spaced from one side of the same and adjacent the rearmost end of the bracket, one arm of said lever being adapted to be connected to the said drag link of the tractor at the side of the tractor, said bell crank lever being adapted to oscillate in a horizontal plane whereby endwise movement of the drag link will be accompanied by turning movement of the bell crank lever about its pivotal point, a crank arm fixed to the yoke centrally thereof and extending horizontally and rearwardly thereof beneath said bracket, a link connected at one end to the inner end of said crank arm and at its other end to the end of the other arm of the bell crank lever whereby swinging movement of the bell crank lever will be accompanied by reverse swinging movement of the yoke, a lateral frame member fixed at its center to said bearing and adapted to be connected at its outer ends to the underside of the radiator of the tractor adjacent the sides thereof.

ELVIN D. DE WITT.

REFERENCES CITED

The following references are of record in the file of this patent:

UNITED STATES PATENTS

| Number | Name | Date |
|---|---|---|
| 1,153,692 | Kardell | Sept. 14, 1915 |
| 2,074,685 | Engstrom | Mar. 23, 1937 |
| 2,247,725 | Ferguson | July 1, 1941 |